US006965839B2

(12) United States Patent
Floyd et al.

(10) Patent No.: US 6,965,839 B2
(45) Date of Patent: Nov. 15, 2005

(54) PROACTIVE AUTOMATED CALIBRATION OF INTEGRATED CIRCUIT INTERFACE

(75) Inventors: Michael Stephen Floyd, Austin, TX (US); Asher S. Lazarus, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 198 days.

(21) Appl. No.: 10/425,395

(22) Filed: Apr. 28, 2003

(65) Prior Publication Data

US 2004/0225461 A1 Nov. 11, 2004

(51) Int. Cl.[7] ........................ G01D 18/00; G01D 21/00
(52) U.S. Cl. ........................................................ 702/85
(58) Field of Search ................................ 702/182–185, 702/187, 85, 107; 713/400, 401; 714/700, 714/798

(56) References Cited

U.S. PATENT DOCUMENTS

| | | | | |
|---|---|---|---|---|
| 5,940,782 | A * | 8/1999 | Gottshall et al. | 702/107 |
| 6,298,073 | B1 * | 10/2001 | LeFever | 370/503 |
| 6,343,024 | B1 * | 1/2002 | Zabroda | 363/22 |
| 6,347,287 | B1 * | 2/2002 | Beckett et al. | 702/89 |
| 6,417,675 | B1 * | 7/2002 | Johnson | 324/601 |
| 6,766,464 | B2 * | 7/2004 | Collier | 713/503 |
| 6,792,372 | B2 * | 9/2004 | Lee | 702/107 |
| 2002/0087280 | A1 * | 7/2002 | To et al. | 702/107 |
| 2003/0070123 | A1 * | 4/2003 | Meaney et al. | 714/700 |
| 2003/0217302 | A1 * | 11/2003 | Chen et al. | 713/401 |
| 2004/0054490 | A1 * | 3/2004 | Bradley et al. | 702/107 |
| 2004/0083070 | A1 * | 4/2004 | Salmon et al. | 702/107 |
| 2004/0153877 | A1 * | 8/2004 | Agarwala | 714/48 |

* cited by examiner

*Primary Examiner*—Michael Nghiem
*Assistant Examiner*—Demetrius Pretlow
(74) *Attorney, Agent, or Firm*—Joseph P. Lally; Casimer K. Salys

(57) ABSTRACT

An integrated circuit device and system of devices in which a device interface incorporates dynamic, elastic calibration facilities. The interface includes a calibration manager and circuitry for monitoring the interface signals to detect the presence of signal skew, delay, or other degradation. If the monitor detects an out-of-calibration interface, the calibration manager initiates a dynamic calibration procedure. The calibration manager can also initiate the dynamic calibration procedure in response to an event such as the detection of a correctable error on the interface. By proactively monitoring the interface for degradation, the calibration manager is responsive to environmental changes as they occur and is efficient in its use of the calibration procedure by invoking it only when calibration is required.

19 Claims, 3 Drawing Sheets

PROACTIVE AUTOMATED CALIBRATION OF INTEGRATED CIRCUIT INTERFACE

BACKGROUND

1. Field of the Present Invention

The present invention generally relates to the field of integrated circuits and more particularly to the interfaces in an integrated circuit that enable communication with another integrated circuit.

2. History of Related Art

In high speed data processing systems employing multiple integrated circuits (modules or chips), inter-device communication is facilitated through chip interfaces that typically include buffering and driver circuitry. These interfaces typically compensate for static manufacturing and design variables. These static variables include silicon doping levels, electrical line length and width variations, both within a chip and on a printed circuit board (PCB) to which the chip is attached, inherent design tolerances, and the like. As their name implies, static variables are typically fixed after manufacturing and remain generally constant over the life of the system.

Systems and methods to compensate for the effect of static variables are known. Compensation for static variables typically occurs at system power-on. During a static variable compensation process, signals on an interface in the system are adjusted on the receive chip's silicon to optimize performance. Interfaces capable of being tuned in this manner are referred to as tunable interfaces.

An example tunable interface process from the assignee of the present application is referred to as the Initialization Alignment Procedure (IAP). The IAP is described, for example, in a co-pending, commonly owned, U.S. patent application: Dreps et al., Elastic Interface Apparatus and Method Thereof, Ser. No. 09/961,506, filed Sep. 24, 2001 [hereinafter "Dreps"]. The IAP is a sub-process within the system power-on procedure, which typically can take several seconds or minutes to complete.

As microprocessor clock frequencies continue to increase, so must the clocking frequencies of inter-chip busses, such as the busses between the microprocessor an external cache memory, system memory, and I/O devices if the processor is to be fully supplied with instructions and data. To achieve high speed busses, aggressive interface device designs must be incorporated on the microprocessor and support chips. Moreover, compensation for static variables is just the beginning. Transient environmental changes in an operating computer system, such as changes in temperature and voltage seen by the chips transmitting and receiving data via a bus interface, may cause the timing of data being transmitted across that bus interface to drift.

In the past, interface designs simply increased or relaxed their operating margins to account for this dynamic interface variation. Increased operating margin, unfortunately, results in slower interface speeds because the transient drift may account for as much as half of the data valid window margins. It would therefore be desirable to implement an integrated circuit device interface with the ability to compensate for transient or dynamic drift so that maximum performance over the interface is achievable.

A prior effort to achieve dynamic recalibration described in Floyd, et al., Data Processing System and Method with Dynamic Idle for Tunable Interface Calibration, U.S. patent application Ser. No. 09/946,217 filed Sep. 5, 2001 [hereinafter "Floyd"] incorporated a periodic system idle to recalibrate the interface. While this approach achieves dynamic recalibration, the periodic system idle approach has drawbacks. First, if a system interface does drift out of calibration, it will continue to operate out of calibration until the next periodic recalibration takes place. In the interim, the system may experience correctable errors or even permanent data loss. While this problem can be lessened by increasing the periodic calibration frequency, such a solution would decrease overall system performance since the calibration consumes the bandwidth of the interface and requires an overhead routine to protect the system's data from corruption. Second, the periodic calibration may occur at a time when the interface is within specification thereby unnecessarily incurring the calibration procedure overhead. Accordingly, it would be desirable to implement a system that implemented dynamic calibration of an interface that did not suffer from the drawbacks of the periodic calibration implementation.

SUMMARY OF THE INVENTION

The problems identified above are in large part addressed by an integrated circuit device and system of devices in which a device interface incorporates dynamic, elastic calibration facilities. In addition, the interface includes a calibration manager and circuitry for monitoring the interface signals to detect the presence of signal skew, delay, or other degradation. If the monitor detects an out-of-calibration interface, the calibration manager initiates a dynamic calibration procedure. The calibration manager can also initiate the dynamic calibration procedure in response to an event such as the detection of a correctable error on the interface. By proactively monitoring the interface for degradation, the calibration manager is responsive to environmental changes as they occur and is efficient in its use of the calibration procedure by invoking it only when calibration is required. With this automated and proactive calibration procedure, the invention enables the design of an interface having significantly less margin than would be possible in the presence of environmentally induced drift.

BRIEF DESCRIPTION OF THE DRAWINGS

Other objects and advantages of the invention will become apparent upon reading the following detailed description and upon reference to the accompanying drawings in which.

Figure 1:
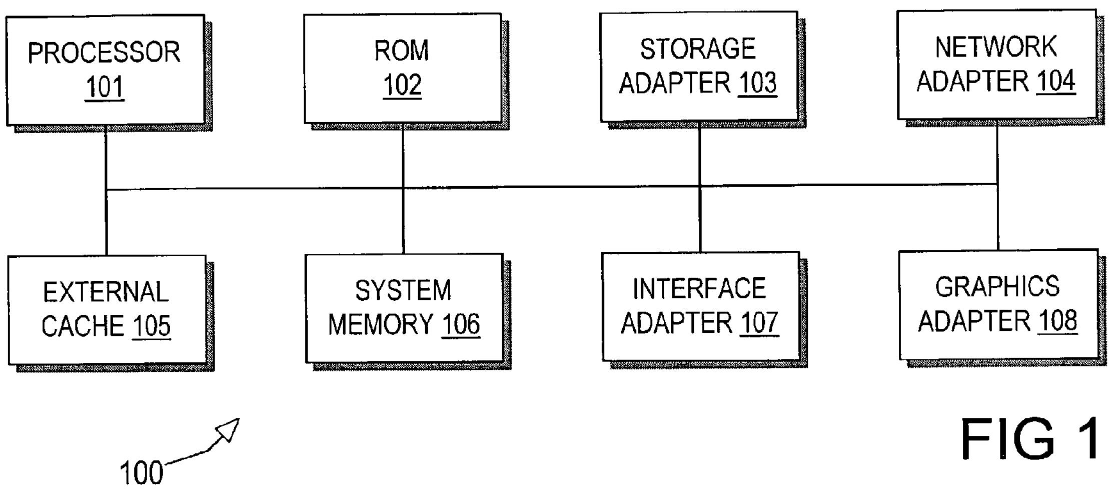
FIG. 1 is a block diagram of selected elements of a data processing system according to the present invention emphasizing the physically distinct chips of the system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates selected elements of a data processing system 100 according to a representative embodiment of the present invention. The depicted embodiment of system 100 includes a microprocessor 101 interconnected with numerous system components and peripheral devices. The components include an external cache memory 105 (in addition to any internal cache of processor 101) for storing recently accessed data and instructions, a system memory 106 for storing working copies of data and executable instructions, read only memory (ROM) 102 for storing persistent code including the system's basic I/O system (BIOS). The depicted embodiment of system 100 also includes storage adapter 103 for connecting peripheral devices such as hard disk units and tape drives (not shown) to system 100, an interface adapter 107 for connecting a keyboard and mouse (not shown), a network adapter 104 for connecting system 100 to a data processing network, and a graphics adapter 108 for connecting a display device (not shown) to the system. It will be readily appreciated that the elements depicted in FIG. 1 represent an exemplary design and that any actual system may include fewer, more, and/or different integrated circuits than the ones shown in FIG. 1.

The depicted elements of system 100 are typically implemented as physically distinct integrated circuits each of which may be referred to herein as a data processing device, chip, or module. Communication between any two or more of these devices is achieved using an externally accessible device connected to an external interconnect such as a wire in a printed circuit board, a connector cable, and the like. High speed inter-device communication is generally difficult to achieve because external interconnects typically have a greater inherent capacitance, resistance, and variability than the internal interconnects within any device. At least in part due to these factors, inter-device communication may be a limiting factor in the system's overall performance.

As described above, integrated circuit and system designers incorporate interface mechanisms that can reduce or eliminate both static and dynamic variability associated with the inter-device communication to achieve the smallest variability in inter-device signal timing. With reduced variability in signal timing, the interface can be tuned to achieve the highest possible data throughput or bandwidth because less signal margin is required to account for skew, delay, and so forth. System 100 and its integrated circuits 101 through 108 depicted in FIG. 1 include mechanisms that can calibrate a device's interface to compensate for dynamic variability.

Figure 2:
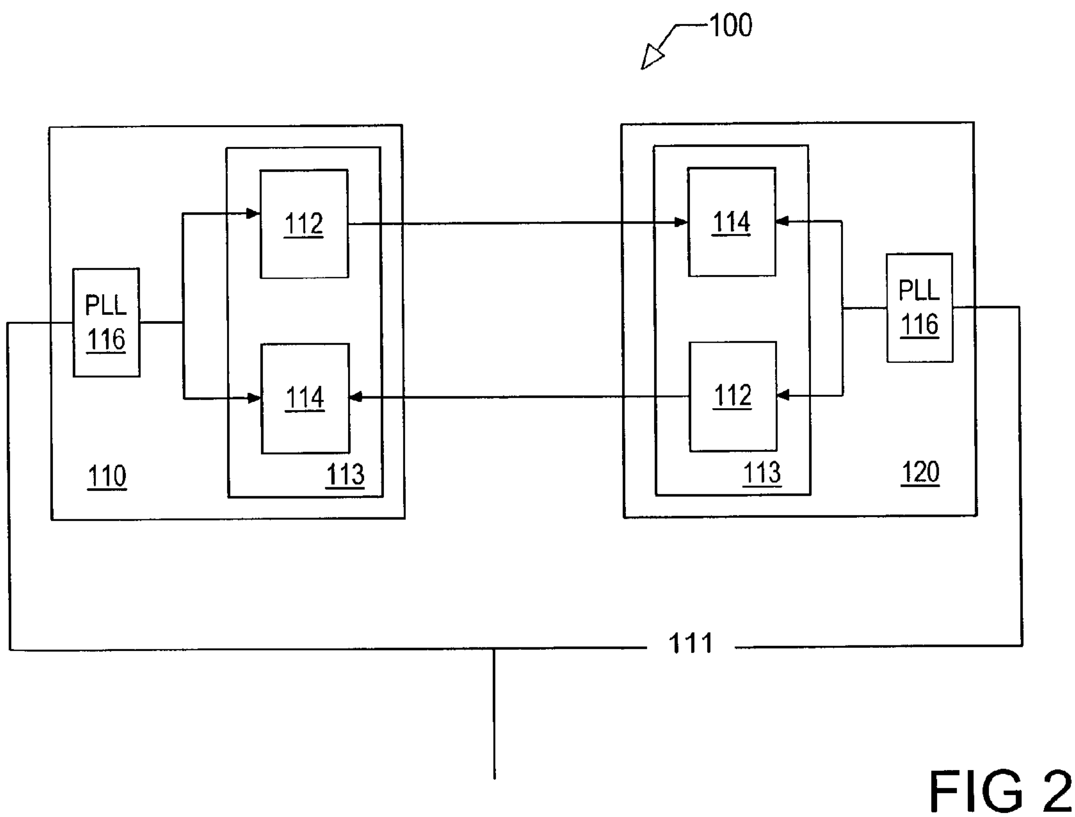
FIG. 2 is a block diagram of selected interface elements in two of the chips of FIG. 1.
Figure 3:
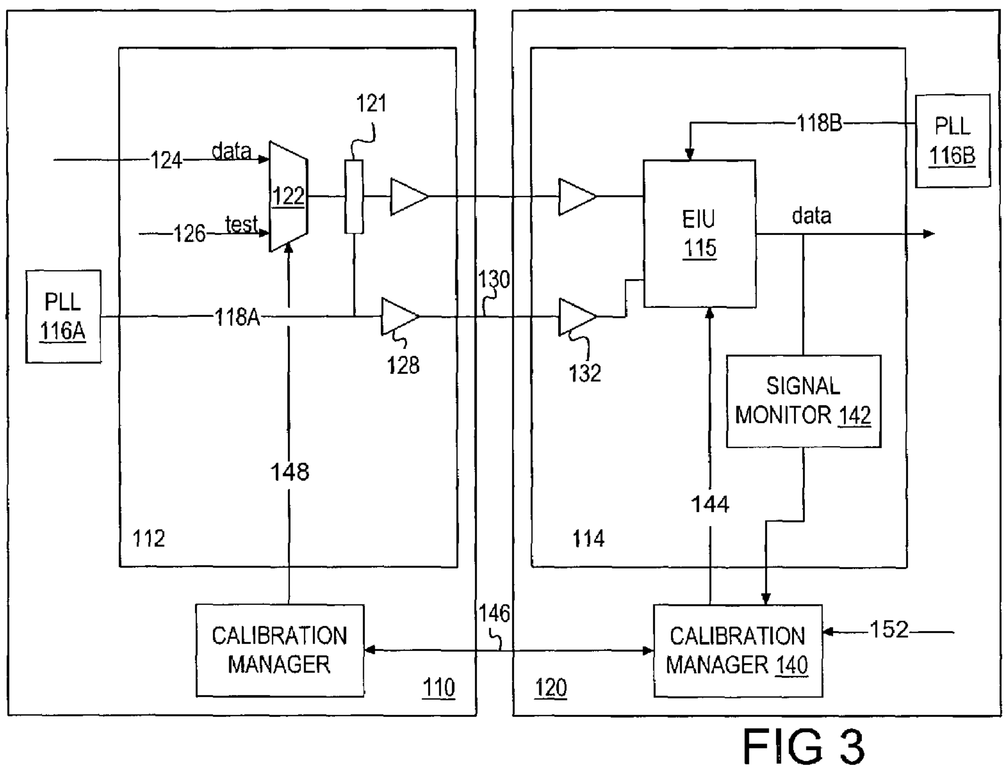
FIG. 3 illustrates additional detail of the interface of FIG. 2.

Referring to FIG. 2 and FIG. 3, selected elements of data processing system 100 are illustrated to emphasize the proactive interface calibration mechanism of the present invention. In this illustration, a first chip of system 100 is represented by reference numeral 110 while a second chip is represented by reference numeral 120. First and second integrated chips 110 and 120 may be any of the integrated circuits 101 through 108 of FIG. 1.

First and second chips 110 and 120 each include an elastic interface 113 for optimized inter-chip communication. Generally, elastic interface 113 includes an elastic drive interface 112 for sending data to another chip and an elastic receive interface 114 for receiving data from another chip. A pair of phase locked loops (PLL's) 116A and 116B, which preferably have matching designs, provide clocks to drive and receive interfaces 112 and 114 respectively. PLL 116A provides a local clock 118A that drives a data latch 121 of drive interface 112 while PLL 116B provides a local clock 118B to an elastic interface unit 115 of receive interface 114. In the depicted embodiment, PLL's 116A and 116B are driven by a common clock 111, which may be the system clock. It should be noted that, although the embodiment depicted in FIG. 2 and FIG. 3 emphasizes a multi-device or multi-package implementation in which interfaces 112 and 114 facilitate communication between physically distinct packages, the invention is also applicable to multi-chip module (MCM) implementations in which multiple chips are attached to a common silicon or ceramic base and enclosed within a single package and to intra-chip implementations where interfaces 112 and 114 facilitate communication between functional blocks of a single large device. In these embodiments, reference numerals 110 and 120, instead of referring to physically distinct integrated circuits, represent functional blocks of a single integrated circuit or functional blocks of a single MCM. For the sake of simplicity and clarity, the remainder of the disclosure will refer specifically to the multiple device implementation.

As depicted in FIG. 3, elastic drive interface 112 of first chip 110 includes a multiplexer 122 configured to select between normal operational data 124 and calibration or test data 126 as the source of data for the corresponding elastic receive unit 114 of second chip 120. (Drive interface 112 of second chip 120 and receive interface 114 of first chip 110 are not depicted in FIG. 3). Each elastic receive unit 114 includes an elastic interface unit 115. The local clock 118A of drive interface 112 is passed through a signal buffer 128 that outputs a bus clock 130 that is received by receive interface 114 via a buffer 132. Elastic interface unit 115 enables dynamic calibration of the communication interface between chips 112 and 114 as described in Dreps and Floyd. When an interface calibration is in progress, drive interface 112 selects test data 126 as the source of data and transmits the test data to receive unit 114. Elastic interface unit 115 is configured to adjust the timing and/or voltage levels of individual interconnect signals to minimize signal degradation. Each chip is responsible for halting transmission of its normal data 124 during an interface calibration procedure.

The elastic interface unit 113 of each chip 101 through 108 according to the present invention is configured to control the interface calibration process by proactively monitoring its receive interface 112 for signs of signal degradation. If an unacceptable level of degradation is detected, elastic interface unit 113 can initiate an elastic interface calibration (EICAL) procedure to compensate for the degradation. As long as the interface signals remain within a specified tolerance, elastic interface unit 113 refrains from initiating EICAL. By incorporating proactive monitoring of the interface signals, the present invention beneficially enables the system designer to a significantly greater portion of an interface's theoretical bandwidth (i.e., the bandwidth achievable in the total absence of degradation due to noise, skew, delay, and so forth). By continuously monitoring the integrity of the interface signals, the invention is able to calibrate the interface as soon as and no sooner than calibration is needed. In this manner, the proactively monitored interface significantly reduces or eliminates the signal margin required in designs that must anticipate a certain level of signal degradation.

As depicted in FIG. 3, the receive interface 114 of each chip incorporates a calibration manager unit identified by reference numeral 140. Calibration manager 140 is a state machine configured to control the initiation of an elastic interface calibration process. As depicted in FIG. 3, receive interface 114 further includes a signal monitor 142 suitable for use in conjunction with the proactively monitored calibration concept. Signal monitor 142, as its name suggests, is designed to determine voltage levels of data signals received by receive interface 114 at precisely defined moments. These precisely defined moments preferably include moments at the temporal edges of the data valid window for each of the data signals. By determining whether a digital signal is at an acceptable voltage level at the very beginning and possibly at the very end of the data valid window, the signal monitor can effectively determine whether the interface signal timing is acceptable.

Figure 4:
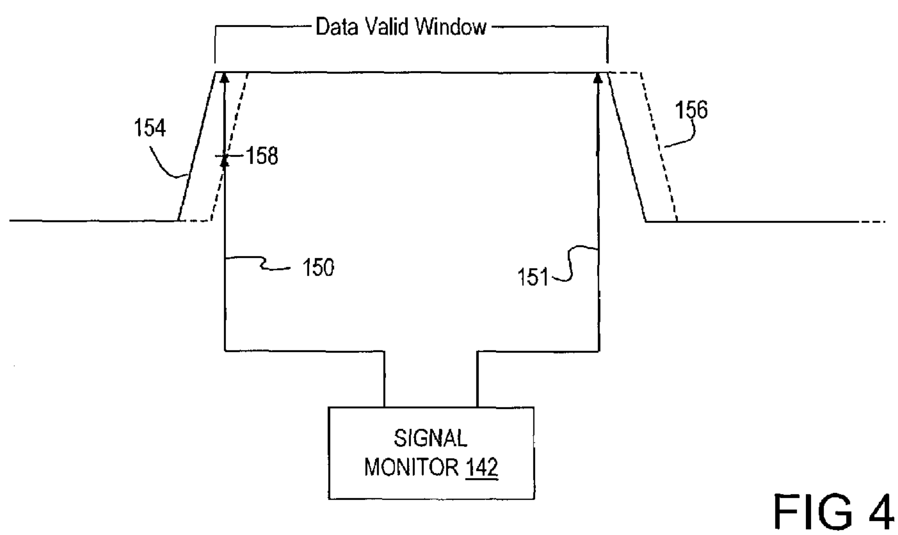
FIG. 4 is a conceptual illustration of interface signal degradation and a method of detecting degradation with a monitoring circuit.

FIG. 4 of the drawings illustrates the functioning of signal monitor 142 according to one embodiment of the invention. Signal monitor 142 includes high speed and precisely timed sampling circuitry that samples the voltage level of a particular data signal at a first point in time (represented in FIG. 4 by reference numeral 150) and a second point in time 151. First and second points in time are preferably located in close proximity to the leading and trailing edges of the data valid timing window specified for the interface. When a signal 154 that is within calibration is sampled at the two points in time by signal monitor 142, the sampled voltages will both be at an acceptable voltage level. When, however, a signal 156 that is out of calibration is monitored, the sampled voltage 158 at first time point 150 will be unacceptable.

In one embodiment, signal monitor 142 monitors data continuously as it is received by receive interface 114. Signal monitor 142 may include logic, firmware, or associated software that facilitate its determination of whether unacceptable interface signal degradation exists. As an example, signal monitor 142 may incorporate damping or filtering to suppress premature initiation of a calibration procedure when a spurious value is detected due to random noise or some other highly transient condition. Thus, signal monitor 142 may incorporate some form of out-of-calibration confirmation in addition to detection circuitry.

Calibration manager 140 receives data from signal monitor 142. In one simple embodiment, signal monitor 142 may assert a 1-bit signal when it determines the interface to be out of calibration. Calibration manager 140 is configured to respond to an out of calibration indication from signal monitor 142 (or from another source as discussed further below) by initiating corrective action. More specifically, calibration manager 140 responds to an out of calibration procedure by initiating an EICAL procedure. In the depicted embodiment, calibration manager 140 provides a signal 144 to elastic interface unit 115. When calibration manager 140 believes that calibration is required, it asserts signal 144. Elastic interface unit 115 according to the present invention is configured to respond to the assertion of signal 144 by performing an EICAL procedure.

The calibration managers 140 of each chip work in concert to take appropriate action when interface calibration is required. In the depicted embodiment, for example, the calibration manager 140 associated with receive interface 114 provides a signal 146 to the calibration manager associated with drive interface 112. Calibration manager 140 asserts signal 146 to inform the drive interface that a calibration process is being initiated so that the drive interface 112 can take appropriate action to shut down the transmission of operational data 124.

The calibration manager of drive interface 112 preferably provides some form of acknowledgement to calibration manager 140 when it has completed the termination of normal data transmission. When the termination of normal data transmission is complete, the calibration manager of drive interface 112 asserts signal 148 and thereby configures multiplexer 122 to select the test data 126 for transmission to receive interface 114. Following acknowledgement from the calibration manager of drive interface, elastic interface unit 115 can calibrate the interface to compensate for current voltage, temperature, and other environmental conditions. When the EICAL procedure is complete, elastic interface unit is configured to inform calibration manager 140. Calibration manager 140 can then convey the completion indication to the calibration manager of drive interface 112 so that normal data transmission can resume.

Calibration manager 140 as depicted in FIG. 3 is configured to respond to multiple indicators of an out-of-calibration interface. In addition to signals generated by signal monitor 142, calibration manager 140 receives one or more error signals 152. Error signals 152 are indirect indicators that the interface needs calibration. Error signals 152 may be asserted, for example, when an ECC correctable error (CE) is detected on the interface. Processor 101 and at least some of the other chips of system 100 typically include some form of error correction circuitry that can recover data when a single bit or a small number of bits are erroneously decoded by receive interface 114. In one embodiment, error correction circuitry (not shown) provides error signal 152 to calibration manager 140 and calibration manager 140 responds to the assertion of error signal 152 by initiating an EICAL. Calibration manager 140 may incorporate decision making such that a transient assertion of an ECC error signal may not generate an EICAL.

Figure 5:
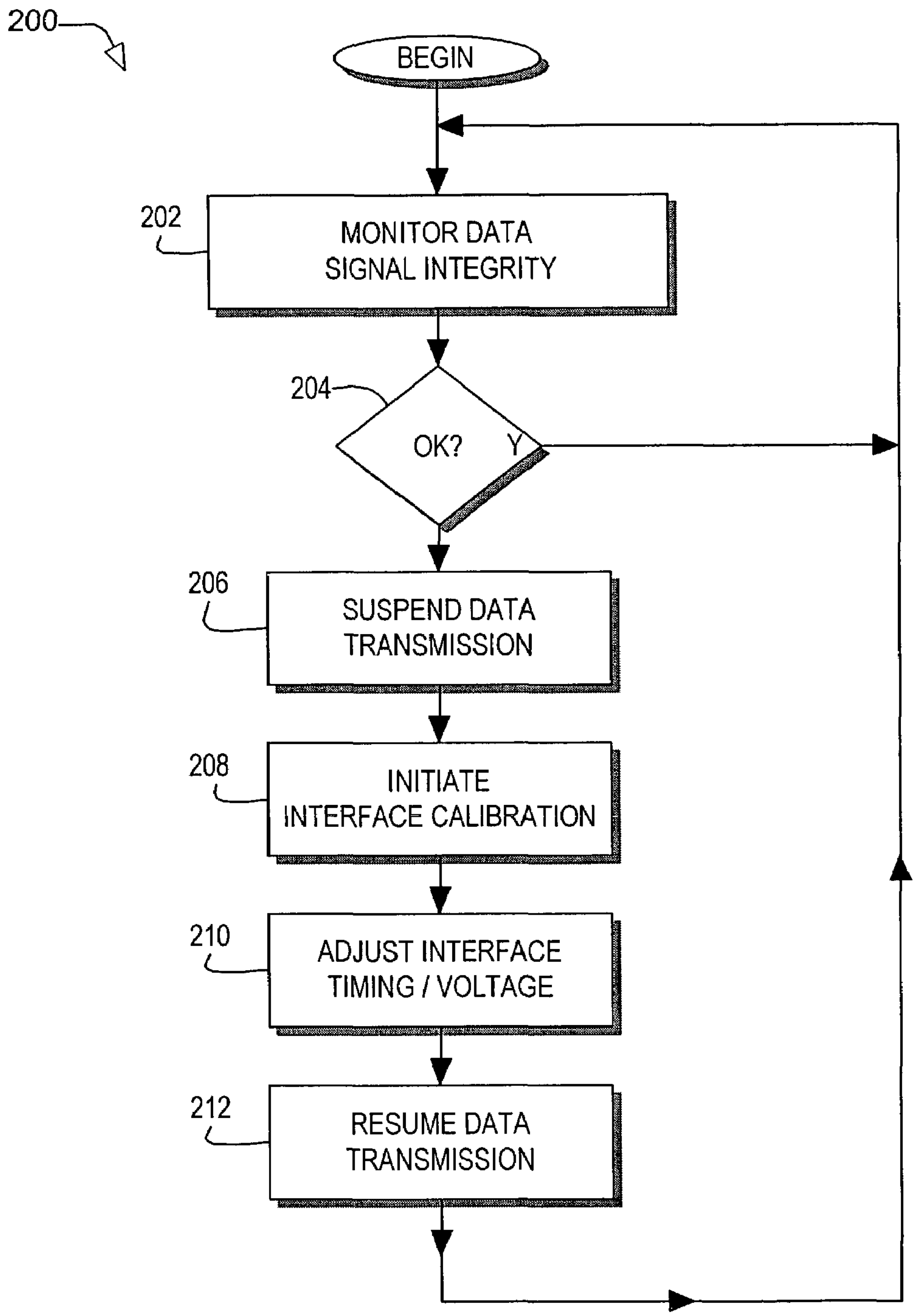
FIG. 5 is a flow diagram of a method of maintaining an inter-chip communication interface in a data processing system.

At least some portions of the present invention may be implemented as software or a set of computer executable instructions stored on a computer readable medium. In conjunction with the elements illustrated above in conjunction with FIG. 2 and FIG. 3, system 100 according to the present invention is enabled to perform a method or process 200 as conceptually represented in the flow diagram of FIG. 5. In the depicted embodiment, the proactive calibration process includes monitoring (block 202) the integrity of the interface signal integrity by a signal monitor, a calibration manager receiving error signals, or a combination thereof. If the monitored signal integrity is acceptable (block 204), no corrective action is taken and the system continues to monitor the interface. If data degradation is detected, however, corrective action is initiated by terminating (block 206) the transmission over the interface of functional data. When the termination of normal data transmission is acknowledged, an elastic interface calibration process is initiated (block 208). The calibration procedure preferably adjusts (block 210) the interface timing, voltage levels, or both to compensate for the detected degradation. Following the interface calibration, normal data transmission is resumed (block 212) and the monitoring of the interface begins again. In this manner, system 100 is enabled to monitor and respond to changes in the interface characteristics that occur during normal operation. The source of these changes is typically temperature or voltage related. Temperature and voltage level variations are commonplace in data processing systems and cannot be totally eliminated. By providing mechanisms that addresses these problems dynamically on an as-need basis, the invention enables the design of an interface capable of sustaining a higher bandwidth than a comparable interface that must account for temperature and voltage dependent fluctuations by relaxing the timing constraints of the interface.

It will be apparent to those skilled in the art having the benefit of this disclosure that the present invention contemplates a system and method for dynamically adjusting the characteristics of an inter-chip communication interface. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:

an integrated circuit functional block of an integrated circuit including an interface for receiving data from a second integrated circuit functional block wherein the received interface includes an interface calibration unit;

a calibration manager for detecting a degradation in the received data, the calibration manager configured to initiate the interface calibration unit in response thereto; and a signal monitor to measure degradation associated with the interface, the signal monitor being configured to signal the calibration manager when the signal monitor detects degradation.

2. The system of claim 1, wherein the signal monitor is configured to sample the voltage of an interface signal at at least one point in time proximal to a data valid window boundary of the interface.

3. The system of claim 2, wherein the signal monitor is further configured to sample the voltage of the interface signal at a second point in time proximal to a trailing edge of the data valid window.

4. The system of claim 1, wherein the calibration manager also receives and initiates the interface calibration process in response to a signal indicating a bit error associated with the interface.

5. The system of claim 1, wherein the degradation detected by the calibration manager is further characterized as dynamic degradation.

6. The system of claim 1, wherein the first integrated circuit functional block comprises a portion of a first integrated circuit and the second integrated circuit functional block comprises a portion of a second integrated circuit functional block.

7. The system of claim 1, wherein the second integrated circuit includes a second interface for receiving data from the first integrated circuit and wherein the second receive interface includes a second interface calibration unit.

8. A integrated circuit, comprising;

an interface calibration unit to calibrate an interface connecting an integrated circuit functional block of the integrated circuit to a second integrated circuit functional block;

a monitor of the interface to determine degradation in an interface signal; and a calibration manager to receive information from the monitor and configured to initiate the interface calibration unit responsive to the monitor determing interface signal degradation to compensate for dynamic interface degradation.

9. The integrated circuit of claim 8, wherein the calibration manager is faster configured to terminate transmission of data from the second integrated circuit prior to initiating the interface calibration.

10. The integrated circuit of claim 8, wherein the calibration manager is further configured to initiate the interface calibration unit responsive to receiving information indicative of a bit error associated with the interface.

11. The integrated circuit of claim 8, wherein the monitor includes voltage sampling circuitry and means for sampling the voltage of an interface signal at a point in time proximal to a data valid window of the interface.

12. The integrated circuit of claim 8, wherein the dynamic interface degradation is further characterized as dynamic interface degradation associated with temperature and voltage fluctuations associated with the interface.

13. The integrated circuit of claim 8, further comprising a drive interface unit suitable for transmitting data to a receive unit of the second integrated circuit functional block, wherein the drive unit is enabled to transmit test data to the second integrated circuit functional block during the calibration procedure.

14. A method of maximizing useable bandwidth of an interface between first and second integrated circuit functional blocks of a data processing system, comprising:

monitoring the interface to detect interface signal degradation dynamically while using the interface to transmit data between the first and second integrated circuit functional blocks;

responsive to detecting signal degradation, halting transmission of data between the integrated circuit functional blocks and performing an interface calibration procedure to compensate for the detected degradation; and resuming transmission of data following the calibration procedure and continuing to transmit data until a subsequent detection of interface signal degradation.

15. The method of claim 14, wherein monitoring the interface comprises sampling a voltage of an interface signal at at least one specified instance in time.

16. The method of claim 15, wherein the at least one specified instance in time includes an instance proximal to a data valid window boundary associated with the interface.

17. The method of claim 14, wherein monitoring comprises detecting a correctable bit error associated wit the interface.

18. The method of claim 14, wherein performing the calibration procedure includes transmitting test data from the first functional block to the second functional block.

19. The method of claim 14, wherein detecting signal degradation is further characterized as detecting signal skew or delay.

* * * * *